(12) United States Patent
Zigdon et al.

(10) Patent No.: US 11,876,788 B2
(45) Date of Patent: Jan. 16, 2024

(54) MOBILE DEVICE SYSTEM AND METHOD FOR PREVENTING NETWORK SIGNAL INTERCEPTION AND HACKING

(71) Applicant: Assac (S.Z.) Networks Israel Ltd., Ramat Hasharon (IL)

(72) Inventors: Shimon Zigdon, Netanya (IL); Shabtai Dvir, Ramat Gan (IL); Eyal Tzur, Ramat Hasharon (IL); Benny Epand, Raanana (IL)

(73) Assignee: Assac (S.Z.) Networks Israel Ltd., Ramat Hasharon (IL)

( * ) Notice: Subject to any disclaimer, the term of this patent is extended or adjusted under 35 U.S.C. 154(b) by 168 days.

(21) Appl. No.: 17/402,983

(22) Filed: Aug. 16, 2021

(65) Prior Publication Data

US 2021/0377233 A1 Dec. 2, 2021

Related U.S. Application Data

(63) Continuation of application No. 16/294,172, filed on Mar. 6, 2019, now Pat. No. 11,171,935, which is a
(Continued)

(51) Int. Cl.
*H04L 29/06* (2006.01)
*H04L 9/40* (2022.01)
(Continued)

(52) U.S. Cl.
CPC ........ *H04L 63/0471* (2013.01); *H04L 65/104* (2013.01); *H04L 65/1104* (2022.05);
(Continued)

(58) Field of Classification Search
CPC ............. H04L 63/0471; H04L 65/1104; H04L 65/104; H04L 67/34; H04W 12/122; H04W 12/033; H04W 88/02; H04M 7/125
See application file for complete search history.

(56) References Cited

U.S. PATENT DOCUMENTS 5,835,603 A 11/1998 Coutts et al.
7,693,180 B1 4/2010 Singh et al.
(Continued)

FOREIGN PATENT DOCUMENTS

CN 202178780 U 3/2012
CN 102831163 A 12/2012
(Continued)

OTHER PUBLICATIONS

International Search Report for International Application No. PCT/IL2017/051004, dated Jan. 8, 2018, 6pp.
(Continued)

*Primary Examiner* — Tri M Tran
(74) *Attorney, Agent, or Firm* — The Roy Gross Law Firm, LLC; Roy Gross

(57) ABSTRACT

The present invention pertains to a method and system for preventing unauthorized access via signal interception and hacking to a user's secure mobile device. One embodiment of the system further comprises an encryption server in communication with the secure mobile device, a clear server in communication with a clear mobile device, and a termination gateway in connection with secure and clear POTS phones on the PSTN. The termination gateway communicates with the clear and encryption servers by IP tunneling. The system enables universal access between secure and non-secure packet-switched phone lines, operating via the Internet, and clear and secure circuit-switched phone lines operating on the PSTN.

14 Claims, 10 Drawing Sheets

Related U.S. Application Data continuation-in-part of application No. PCT/IL2017/051004, filed on Sep. 6, 2017.

(60) Provisional application No. 62/383,607, filed on Sep. 6, 2016.

(51) Int. Cl.

| | | |
|---|---|---|
| *H04L 67/00* | (2022.01) | |
| *H04W 12/033* | (2021.01) | |
| *H04W 12/122* | (2021.01) | |
| *H04W 12/128* | (2021.01) | |
| *H04L 65/1104* | (2022.01) | |
| *H04L 65/1033* | (2022.01) | |
| *H04M 7/12* | (2006.01) | |
| *H04W 88/02* | (2009.01) | |

(52) U.S. Cl.
CPC ............ *H04L 67/34* (2013.01); *H04M 7/125* (2013.01); *H04W 12/033* (2021.01); *H04W 12/122* (2021.01); *H04W 12/128* (2021.01); *H04W 88/02* (2013.01)

(56) References Cited

U.S. PATENT DOCUMENTS

| | | | |
|---|---|---|---|
| 7,983,254 B2 | 7/2011 | Alt et al. | |
| 8,582,567 B2 | 11/2013 | Kurapati et al. | |
| 8,875,273 B2 | 10/2014 | Sobolewski et al. | |
| 9,306,962 B1 | 4/2016 | Pinto | |
| 2006/0123224 A1* | 6/2006 | Klug | H04K 1/00 |
| | | | 713/150 |
| 2011/0263224 A1 | 10/2011 | Kramarenko et al. | |
| 2011/0302408 A1* | 12/2011 | McDermott | H04L 65/104 |
| | | | 713/168 |
| 2013/0097706 A1 | 4/2013 | Titonis et al. | |
| 2013/0108044 A1 | 5/2013 | Galwas et al. | |
| 2015/0230084 A1* | 8/2015 | Parsons | H04W 12/033 |
| | | | 455/411 |
| 2015/0312272 A1 | 10/2015 | Dobbins et al. | |
| 2015/0326587 A1 | 11/2015 | Vissamsetty et al. | |
| 2016/0191645 A1* | 6/2016 | Hayton | H04L 67/568 |
| | | | 709/203 |

FOREIGN PATENT DOCUMENTS

| | | | | |
|---|---|---|---|---|
| CN | 103684997 A | 3/2014 | | |
| CN | 104038739 A | 9/2014 | | |
| EP | 2208371 B1 | 7/2011 | | |
| WO | WO-2005057893 A2 * | 6/2005 | ........... | H04L 63/061 |
| WO | 2009064596 A1 | 5/2009 | | |

OTHER PUBLICATIONS

Written Opinion for International Application No. PCT/IL2017/051004, dated Jan. 8, 2018, 7pp.

International Preliminary Report on Patentability for International Application No. PCT/IL2017/051004, completed Jan. 30, 2019, 18pp.

European Search Report for European Application No. 17848286.5 (PCT/IL2017/051004) dated Jun. 23, 2020, 11pp.

United Kingdom (U.K.) Search Report for Application No. GB1512324.3, dated Dec. 15, 2015, 1pp.

"Secure Voice on Cisco Integrated Services Routers", CISCO Data Sheet, dated Jan. 1, 2010, pp. 1-9, XP 55071993A. Retrieved from: URL:http://www.cisco.com/en/US/prod/collateral/routers/ps259/product_data_sheet0900aecd8016c784.pdf.

Extended European Search Report for European Patent Application No. 21192207.5, dated May 20, 2022, 6pp.

* cited by examiner

MOBILE DEVICE SYSTEM AND METHOD FOR PREVENTING NETWORK SIGNAL INTERCEPTION AND HACKING

RELATED APPLICATIONS

This application is a Continuation of U.S. Non-Provisional application Ser. No. 16/294,172 filed on Mar. 6, 2019, which is a Continuation-in-Part of PCT Patent Application No. PCT/IL2017/051004 having an international filing date of Sep. 6, 2017, which claims the priority benefit of U.S. Provisional Application No. 62/383,607 filed on Sep. 6, 2016.

FIELD OF THE INVENTION

The present invention generally relates to protection of mobile device computer systems from malicious activity of unauthorized access via signal interception and/or hacking of the device. More particularly, the present invention discloses signal interception and hacking prevention systems and methods that deploy an application executable to refrain unauthorized access to a user's mobile device and to facilitate bilateral integrated prevention and protection of the system.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex inter-chaining/specification of ordered-matter elements. The term "ordered-matter elements" may refer to physical components of computation, such as assemblies of electronic logic gates, molecular computing logic constituents, quantum computing mechanisms, etc.

As outlined above, the reason for the use of functional/operational technical descriptions is at least twofold. First, the use of functional/operational technical descriptions allows near-infinitely complex machines and machine operations arising from inter chained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

Mobile phones have become essential tools for communication and information exchange in the last two decades. Many people rely on their mobile phones in their personal lives as well as their businesses. Most mobile phone users exchange very sensitive and private information using their mobile phones assuming that the mobile phone network is reliable and secure.

The emerging threats to the data carried across mobile devices are not only affecting private consumers but also having a major impact on business. In today's modern enterprise, BYOD, or bring your own device, has become the standard and allows employees privileged access to sensitive corporate data and applications from their own personal mobile devices. Today 89 percent of employees are accessing work-related information on their mobile phones, and 41 percent are doing so without permission of their companies.

The phenomenon, now standard practice in the workplace, means more and more corporate information is at risk thanks to point-and-click spyware attacks against mobile devices. Even when a corporate network is locked down and protected, personal mobile phones are an easy place from which to pilfer data.

Mobile devices have become the new personal computers, storing as much data as a PC but providing greater flexibility and portability. However, while smartphones now perform the same functions as a computer, one critical feature is missing—security. Rapid growth in the use of smart phones, with internet access along with the applications that allow users to bank, shop and socially network, means that fraud risks (including theft of financial information and identity theft), which were previously associated with computers and laptops, are becoming increasingly relevant to mobile handsets. Generally, mobile devices are subjected to two major data security threats: tapping and hacking. The most notable threat to mobile phone users' privacy is signal interception (phone tapping), as these devices are connected to the public switched telephone network (PSTN). The signal can be intercepted either at the radio access node or at the core network. The former case can be implemented by detecting the wireless signal, but this needs cracking of the encrypted signal (if it is encrypted), while the latter case can be implemented by tapping the signal in the switches or transmission medium (optical fiber, coaxial cables, or microwave links), but this requires access to the core network infrastructure. Although the two options seem challenging, both options are feasible particularly for operators, law enforcement officers or even individuals with enough expertise and tools. Hacking of the mobile devices connected to the World Wide Web includes but is not limited to physical connection (physical hacking) to the device in an unauthorized manner; network attacks; application attack (malware); spear phishing attack; configuration attack; rooted or jailbroken compromise device; keylogging; and zero day or unknown attack.

Malware is software that is designed to engage in malicious behavior on a device and is currently regarded as the greatest threat to mobile phones. Malware can commonly perform actions without a user's knowledge such as making changes to the user's phone bill, sending unsolicited messages to the user's contact list, or giving an attacker remote control of the device. Malware can also be used to steal personal information from a mobile device. Currently much of the malware designed for mobile devices requires the user to download or install the software, but according to recent research, future mobile exploits will allow automatic malware installation. Mobile phones can be infected with malware through an open Bluetooth connection, short messaging service (SMS), multimedia messaging service (MMS) and downloadable applications.

Applications distributed through 'app stores' currently pose the greatest malware risk to all mobile operating systems and, according to the experts, will continue to do so in the future. While created as a means to distribute applications to mobile phone users, app stores provide an ideal transport mechanism for the delivery of malicious software to high volumes of mobile devices. Mobile operating system developers manage app stores. They include the Apple App Store, Android Market, Windows Marketplace for Mobile, Blackberry App World, or Nokia's Ovi Store; by known third-party organizations such as Amazon.com or by unknown third party companies. However, the way apps are set up and their relative lack of safeguards makes them soft targets for hackers. Furthermore, the companies that maintain the app stores make no guarantees about the safety or quality of the apps. Users download apps and install them at their own risk. For example, the Google Android platform has seen a 400 percent increase in malware designed to steal user data since 2010, due to Google's relaxed vetting process where anyone can anonymously create and distribute malicious applications.

Another common threat to mobile phone devices is SMiShing. The terms refer to a security attack in which the user is sent an SMS posing as a legitimate service that tricks them into divulging personal information or downloading a virus. For example, a text message may be sent claiming that the recipient's bank account had been blocked and then asks for confirmation of the account details so that a new card could be sent out. Attackers often use email, texts and social networking sites to send links to phishing sites. There is indication that as more people access sensitive accounts and services from their mobile devices, it is expected to see an increase in phishing attacks launched from malware on devices.

Several systems and method that are deployed to facilitate vulnerability protection in mobile devices are known. U.S. Pat. No. 8,582,567B2, System and method for providing network level and nodal level vulnerability protection in VoIP networks, discloses a system, method and apparatus for providing network level and nodal level vulnerability protection in VoIP networks by receiving a communication; filtering the received communication using three or more stages selected from the group comprising a media protection and filtering plane, a policy based filtering plane, a signature based filtering plane, a protocol anomaly detection and filtering plane and a behavioral learning based filtering plane; and either allowing or denying the received communication based the filtering step.

U.S. Patent Application US20150312272 A1, Protecting computing assets from resource intensive querying attacks discloses a method and system for managing data traffic and protecting computing assets. The method and system includes intercepting queries and messages, such as EDNS0 queries, and sending probe queries and reply queries to the originating computing device to determine whether the originating computing device may be sufficiently validated so as to justify forwarding resource-intensive queries and messages to the targeted computing device.

None of the current technologies and prior art, taken alone or in combination, either address or provide a truly integrated solution in a form of a signal interception and hacking prevention system and method that deploy an application executable to refrain unauthorized access to a user's mobile device and to facilitate bilateral integrated prevention and protection of the system.

Therefore, there is a long felt and unmet need for a system and method that overcomes the problems associated with the prior art.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

It is an object of the invention to provide an anti-interception system enabling voice and text communication of protected packet-switched phones with protected circuit-switched phones and clear circuit-switched phones; and of protected circuit-switched phones with protected packet-switched phones and clear packet-switched phones; the system comprising:

a. a computer-readable medium (CRM) of each protected packet-switched phone, installed thereon a non-interception application configured for a processor of the protected packet-switched phone to
  1) encrypt a PSTN-bound voice or text packet-switched signal and transmit the encrypted PSTN-bound packet-switched signal over a packet-switched encrypted access line; and
  2) receive, over the packet-switched encrypted access line, and decrypt an encrypted internet-bound voice or text packet-switched signal;
b. an encryption switch in communicative connection over the Internet with the protected packet-switched phones, the encryption switch configured to
  1) receive and decrypt the encrypted PSTN-bound packet-switched signal, producing a PSTN-bound IP tunneling signal;
  2) transmit the PSTN-bound IP tunneling signal over an IP tunnel; and
  3) receive, over the IP tunnel, and encrypt an internet-bound IP tunneling signal that is destined for the protected packet-switched phone, producing the encrypted internet-bound packet-switched signal;
  4) transmit the encrypted internet-bound packet-switched signal to the protected packet-switched phone;
c. a clear switch in communicative connection over the Internet with a clear packet-switched phone, the clear switch configured to
  1) receive a clear PSTN-bound packet-switched signal from a clear packet-switched phone, producing a PSTN-bound IP tunneling signal transmitted over the IP tunnel; and
  2) receive, over the IP tunnel, a the internet-bound IP tunneling signal that is destined for a clear packet-switched phone, producing an internet-bound clear packet-switched signal transmitted over the Internet to the clear packet-switched phone;
d. a termination gateway, in communicative connection with the encryption switch, the clear switch, and the PSTN; the termination gateway configured to
  1) receive the PSTN-bound IP tunneling signals from the encryption switch and the clear switch;
  2) convert the PSTN-bound IP tunneling signals to PSTN-bound clear circuit-switched signals;
  3) transmit the PSTN-bound clear circuit-switched signals that are destined for a receiving the clear circuit-switched phone to the receiving clear circuit-switched phone, over the PSTN;
  4) receive an encrypted internet-bound circuit-switched signal from a transmitting protected circuit-switched phone over the PSTN;
  5) receive a clear internet-bound circuit-switched signal from a transmitting clear circuit-switched phone over the PSTN;
e. a secure gateway modem in communicative connection with the termination gateway configured to
  1) receive and encrypt clear circuit-switched signals from the termination gateway; and
  2) receive and decrypt encrypted circuit switched signals from the termination gateway;
wherein the termination gateway is further configured to
  1) transmit the clear PSTN-bound circuit-switched signals that are destined for a receiving the protected circuit-switched phone to the secure gateway modem and receive encrypted PSTN-bound circuit-switched signals;
  2) transmit the encrypted PSTN-bound circuit-switched signals destined for the receiving protected circuit-switched phone to the receiving protected circuit-switched phone, over the PSTN;
  3) transmit the internet-bound encrypted circuit-switched signal to the secure gateway modem and receive a the clear internet-bound circuit-switched signal;
  4) convert the clear internet-bound circuit-switched signals to the internet-bound IP tunneling signals and transmit the internet-bound IP tunneling signals over the IP tunnel; and
f. a secure modem for each the protected circuit-switched phone, the secure modem configured to
  1) receive, over an encrypted circuit-switched access line c, and decrypt the encrypted PSTN-bound circuit switched signals;
  2) receive, from a PSTN phone, and encrypt a clear signal PSTN signal, thereby producing the encrypted internet-bound circuit switched signal, and transmit the encrypted internet-bound circuit switched signal over the encrypted circuit-switched access line.

It is a further object of the invention to provide the abovementioned system, wherein the termination gateway is further configured to implement the IP tunneling signals SIP tunneling.

It is a further object of the invention to provide any of the abovementioned systems, wherein the packet-switched phones comprise one or more iPhones, Android phones, Windows phones, or any combination thereof.

It is a further object of the invention to provide any of the abovementioned systems, wherein the application is downloaded and installed on the protected packet-switched phone through an online consumer application store.

It is a further object of the invention to provide any of the abovementioned systems, wherein the encryption switch and the application are further configured for the encryption switch to send push notifications to the protected packet-switched phones.

It is a further object of the invention to provide any of the abovementioned systems, wherein the encryption switch employs a secure SRTP or ZRTP over TLS protocol for communication over the packet-switched encrypted access line.

It is a further object of the invention to provide any of the abovementioned systems, further configured for one or more of PSTN-point to internet-multipoint and internet-point to PSTN-multipoint communication.

It is a further object of the invention to provide any of the abovementioned systems, wherein one or more of the internet-multipoint and the PSTN-multipoint communication comprises at least one secure phone and at least one clear phone.

It is a further object of the invention to provide a hacking-protected secured device connected to a network, the device comprising therein a non-transitory computer-readable medium containing instructions for operation on the device of a hacking prevention system, the system comprising:
a. a correlation module configured to receive timestamped system calls and network calls;
b. a time stamp module, configured to receive the system calls and network calls and associate timestamps with each of the system calls and network calls;
  wherein the correlation module is configured to package the timestamped system calls, and the timestamped network calls into an input vector;

c. an applications privileges database, the database comprising one or more lists of privileges for one or more applications installed on the device;
  wherein the correlation module is configured to receive the one or more lists of privileges;
d. a neural network, configured to receive the input vector;
e. an approved output and a suspected output of the neural network;
f. a mitigation rules engine;
g. wherein:
  i. the correlation module is further configured to compute parameters of the system calls and the network calls, the parameters selected from a group consisting of: a difference in time values of the timestamp of a the system call and a network call, a correspondence of a system call or of a network call with a privilege in one or more of the privileges lists pertaining to an application making the system call or the network call, a validity of a certificate attached to the network call, or any combination thereof and further package the parameters into the input vector;
  ii. the neural network is configured to receive the input vector and determine whether a the system call or a network call is approved or suspected as a hacking attempt of the device;
  iii. one of the approved system calls or network calls is fed to the approved output;
  iv. a suspected system or network call is fed to the suspected output; and
  v. the mitigation rules engine is configured to receive the suspected output and determine an action as a function of the suspected output.

It is a further object of the invention to provide the abovementioned hacking-protected secured device, wherein the neural network is configured to detect correlation between the operating system of the mobile device and network signal transmissions by analyzing training data of the automation process and subsequently producing an inferred function used for new mapping examples.

It is a further object of the invention to provide any of the abovementioned hacking-protected secured devices, wherein one or more of the predetermined risk-based policies are selected from a group consisting of denying incoming transmission by disconnecting Wi-Fi network and connecting to VPN network upon detection of the attack.

It is a further object of the invention to provide any of the abovementioned hacking-protected secured devices, wherein one or more of the forensic data are selected from a group consisting of the attacked source data, attack vector data, attack name data, location data, time data and any combinations thereof.

It is a further object of the invention to provide any of the abovementioned hacking-protected secured devices, wherein the actions of the mitigation rules engine are selected from a group comprising:
a. disconnecting the secured device from the network;
b. invalidating the transmission session;
c. destroying the access keys and/or deleting the system cache;
d. notifying the user by raising an unauthorized access alert;
e. automatically activating a three factor authentication stage;
f. downgrading accessibility and functionality of files to "read-only"; and
g. accessing the network through a VPN.

It is a further object of the invention to provide any of the abovementioned hacking-protected secured devices, wherein an unauthorized access to the network comprises SSL striping, traffic tampering, reconnaissance scan (TCP, UDP, ARP), Rouge Access Point, Rouge FemtoCell, SSL Certificate Tampering (SSL Pinning) or any combination thereof.

It is a further object of the invention to provide any of the abovementioned hacking-protected secured devices, wherein an unauthorized access to an application comprises one or more malicious applications, unknown zero day, time bombs, anti-debugging, live data protection tampering or any combination thereof.

It is a further object of the invention to provide a method for voice and text communication of one or more protected packet-switched phones with protected circuit-switched phones and with clear circuit-switched phones; and of one or more protected circuit-switched phones with protected packet-switched phones and with clear packet-switched phones; the method comprising steps of
a. obtaining the system for voice and text communication of one or more protected packet-switched phones with protected circuit-switched phones and with clear circuit-switched phones; and of one or more protected circuit-switched phones with protected packet-switched phones and with clear packet-switched phones;
b. installing a non-interception application on one or more internet-connected phones, thereby enabling the internet-connected phones as protected packet-switched phones;
wherein communication from packet-switched to circuit-switched phones comprises steps of
c. encrypting a PSTN-bound voice or text packet-switched signal by a transmitting the protected packet-switched phone;
d. transmitting the encrypted PSTN-bound packet-switched signal, by the transmitting protected packet-switched phone, over a packet-switched encrypted access line in connection with the Internet;
e. receiving and decrypting the encrypted PSTN-bound encrypted packet-switched signal, by an encryption switch in connection with the Internet, thereby producing a clear PSTN-bound packet-switched signal;
f. receiving a clear PSTN-bound packet-switched signal, by a clear switch, transmitted from a transmitting clear packet-switched phone over the Internet;
g. transmitting the PSTN-bound clear packet-switched signals, by the encryption switch and the clear switch, as PSTN-bound IP tunneling signals over an IP tunnel;
h. receiving, by a termination gateway connected to the IP tunnel, the PSTN-bound IP tunneling signals and converting the PSTN-bound IP tunneling signals to one or more clear PSTN-bound circuit-switched signals;
i. receiving and encrypting the clear PSTN-bound circuit-switched signals that are destined to a receiving secure circuit-switched phone, by a secure gateway module in communicative connection with the termination gateway;
j. transmitting the encrypted PSTN-bound circuit-switched signals, by the termination gateway, to receiving secure modems connected to the PSTN over circuit-switched encrypted access lines;
k. decrypting, by the secure modems, the encrypted PSTN-bound circuit-switched signals;

l. transmitting, by the secure modem, the decrypted PSTN-bound circuit-switched signal to one or more receiving PSTN phones; and m. transmitting the clear PSTN-bound circuit-switched signals that are destined for a receiving clear circuit switched phone to the receiving clear circuit-switched phones, by the termination gateway over the PSTN; and wherein communication from circuit-switched to packet-switched phones comprises steps of n. encrypting a clear internet-bound circuit-switched signal from a transmitting circuit-switched phone, by a secure modem;

o. transmitting the encrypted internet-bound circuit-switched signal, by the secure modem, over a circuit-switched encrypted access line;

p. receiving the encrypted internet-bound circuit-switched signal, by the termination gateway;

q. decrypting the encrypted internet-bound circuit-switched signal, by the secure gateway module, thereby producing a clear internet-bound circuit-switched signal;

r. receiving, by the termination gateway, a clear internet-bound circuit-switched signal from a transmitting clear circuit-switched phone;

s. converting the clear internet-bound circuit-switched signals to internet-bound IP tunneling signals;

t. transmitting the internet-bound IP tunneling signals, by the termination gateway, over the IP tunnel;

u. receiving, by the encryption switch, the internet-bound IP tunneling signals that are destined to a receiving secure packet-switched phone;

v. encrypting, by the encryption switch, the internet-bound IP tunneling signals destined to a receiving secure packet-switched phone, thereby producing encrypted internet-bound packet-switched signals;

w. transmitting the encrypted internet-bound packet-switched signals to the receiving secure packet-switched phones;

x. receiving, by a receiving secure packet-switched phones over an encrypted access line, the internet-bound packet-switched signals;

y. decrypting the encrypted internet-bound packet-switched signals, by the receiving packet-switched phones; and z. transmitting the internet-bound IP tunneling signals that are destined for a clear receiving packet-switched phone, by the clear server, to the receiving clear packet-switched phones.

It is a further object of the invention to provide the abovementioned method, wherein the steps of producing IP tunneling signals is implemented with SIP tunneling.

It is a further object of the invention to provide any of the abovementioned methods, wherein the packet-switched phones comprise one or more iPhones, Android phones, Windows phones, or any combination thereof.

It is a further object of the invention to provide any of the abovementioned methods, wherein the step of installing a non-interception application on the protected packet-switched phone is done through an online consumer application store.

It is a further object of the invention to provide any of the abovementioned methods, further comprising a step of sending push notifications to the protected packet-switched phones.

It is a further object of the invention to provide any of the abovementioned methods, wherein the encryption switch employs a secure SRTP or ZRTP over TLS protocol for communication over the packet-switched encrypted access line.

It is a further object of the invention to provide any of the abovementioned methods, wherein the communication comprises one or more of PSTN-point to internet-multipoint and internet-point to PSTN-multipoint communication.

It is a further object of the invention to provide any of the abovementioned methods, wherein one or more of the internet-multipoint and the PSTN-multipoint communication comprises at least one secure phone and at least one clear phone.

It is a further object of the invention to provide a method for protecting a secured device from access via hacking, the method comprising the step of installing on the secured device an application executable on a non-transitory computer-readable medium of the secured device; the secured device with the application effecting further steps of the method comprising steps of:

a. receiving one or more system calls and one or more network calls of the secured device, by a timestamp module;

b. timestamping the system calls and the network calls by the timestamp module;

c. packaging the timestamped system calls and timestamped network calls, by a correlation module, into an input vector;

d. receiving, by the correlation module, one or more lists of privileges for one or more applications installed on the secured device;

wherein the method further comprises the steps:

e. computing parameters of the system calls and the network calls, the parameters selected from a group comprising a difference in time values of the timestamp of the system call and network call, a correspondence of the system call or of the network call with a privilege in one or more of the lists pertaining to an application making the system call or the network call, a validity of a certificate attached to the network call, or any combination thereof;

f. further packaging the parameters into the input vector;

a. receiving the input vector by a neural network;

b. determination, by the neural network, of whether the system call or network call is approved or suspected;

c. feeding an approved system or network call to an approved output and a suspected system or network call to a suspected output;

d. receiving, by a mitigation rules engine, the suspected output;

e. determining, by the mitigation rules engine, a mitigating action as a function of the suspected output.

It is a further object of the invention to provide the abovementioned method for protecting a secured device from access via hacking, wherein the neural network configured is further configured to perform a step of detecting correlation between the operating system of the mobile device and network signal transmissions by analyzing training data of the automation process and subsequently producing an inferred function used for new mapping examples.

It is a further object of the invention to provide any of the abovementioned methods for protecting a secured device from access via hacking, wherein one or more of the predetermined risk-based policies are selected from a group consisting of denying incoming transmission by disconnecting a Wi-Fi network and connecting to a VPN network upon detection of the attack.

It is a further object of the invention to provide any of the abovementioned methods for protecting a secured device from access via hacking, wherein one or more of the forensic data are selected from a group consisting of: the attacked source data, attack vector data, attack name data, location data, time data and any combinations thereof.

It is a further object of the invention to provide any of the abovementioned methods for protecting a secured device from access via hacking, wherein one or more of the mitigating actions are selected from a group comprising:
a. disconnected from one or more of the networks;
b. invalidating the transmission session;
c. destroying the access keys and/or deleting the system cache;
d. notifying the user by raising an unauthorized access alert;
e. automatically activating a three factor authentication stage; and
f. downgrading accessibility and functionality of files to "read-only".

It is a further object of the invention to provide any of the abovementioned methods for protecting a secured device from access via hacking, wherein the unauthorized access to the network comprises SSL striping, traffic tampering, reconnaissance scan (TCP, UDP, ARP), Rouge Access Point, Rouge FemtoCell, SSL Certificate Tampering (SSL Pinning) or any combination thereof.

It is a further object of the invention to provide any of the abovementioned methods for protecting a secured device from access via hacking, wherein the unauthorized access to an application comprises detecting malicious applications, unknown zero day, time bombs, anti-debugging, live data protection tampering, privilege escalation or any combination thereof.

It is a further object of the invention to provide the abovementioned anti-interception system enabling voice and text communication of protected packet-switched phones with protected circuit-switched phones and clear circuit-switched phones; and of protected circuit-switched phones with protected packet-switched phones and clear packet-switched phones, wherein a hacking-prevention application is further installed on the protected packet-switched phone, the hacking-prevention application containing instructions for operation of a hacking-prevention system, the system comprising
a. a correlation module configured to receive timestamped system calls and network calls;
b. a time stamp module, configured to receive the system calls and network calls and associate timestamps with each of said system calls and network calls;
 wherein said correlation module is configured to package said timestamped system calls, and said timestamped network calls into an input vector;
c. an applications privileges database, said database comprising one or more lists of privileges for one or more applications installed on said device;
 wherein said correlation module is configured to receive said one or more lists of privileges;
d. a neural network, configured to receive said input vector; and
e. an approved output and a suspected output of said neural network;
f. a mitigation rules engine;
g. wherein:
 i. said correlation module is further configured to compute parameters of said system calls and said network calls, said parameters selected from a group consisting of: a difference in time values of said timestamp of a said system call and a said network call, a correspondence of a said system call or of a said network call with a privilege in one or more of said privileges lists pertaining to an application making said system call or said network call, a validity of a certificate attached to said network call, or any combination thereof and further package said parameters into said input vector;
 ii. said neural network is configured to receive said input vector and determine whether a said system call or a said network call is approved or suspected as a hacking attempt of said device;
 iii. a said approved system call or network call is fed to said approved output;
 iv. a suspected system or network call is fed to said suspected output; and
 v. said mitigation rules engine is configured to receive said suspected output and determine an action as a function of said suspected output.

It is a further object of the invention to provide the abovementioned anti-interception system enabling voice and text communication of protected packet-switched phones with protected circuit-switched phones and clear circuit-switched phones; and of protected circuit-switched phones with protected packet-switched phones and clear packet-switched phones, further comprising a method for protecting the secured device from access via hacking, the method comprising the step of installing on the secured device an application executable on a non-transitory computer-readable medium of the secured device; said secured device with said application effecting further steps of the method comprising steps of:
a. receiving one or more system calls and one or more network calls of said secured device, by a timestamp module;
b. timestamping said system calls and said network calls by said timestamp module;
c. packaging said timestamped system calls and timestamped network calls, by a correlation module, into an input vector;
d. receiving, by said correlation module, one or more lists of privileges for one or more applications installed on said secured device;
wherein the method further comprises the steps:
e. computing parameters of said system calls and said network calls, said parameters selected from a group comprising a difference in time values of said timestamp of a said system call and a said network call, a correspondence of a said system call or of a said network call with a privilege in one or more of said lists pertaining to an application making said system call or said network call, a validity of a certificate attached to said network call, or any combination thereof;
f. further packaging said parameters into said input vector;
g. receiving said input vector by a neural network;
h. determination, by said neural network, of whether a said system call or a said network call is approved or suspected;
i. feeding a said approved system or network call to an approved output and a suspected system or network call to a suspected output;
j. receiving, by a mitigation rules engine, said suspected output;
k. determining, by said mitigation rules engine, a mitigating action as a function of said suspected output.

BRIEF DESCRIPTION OF THE PREFERRED EMBODIMENTS

The novel features believed to be characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings. In order to better understand the invention and its implementation in practice, a plurality of embodiments will now be described, by way of non-limiting example only, with reference to the accompanying drawings, in which FIG. 1 illustrates an operating environment and elements of a system for preventing a third-party interception of a voice or text signal transmitted from a secure a device and addressed to one or more non-secured devices, and/or of a voice or text signal received by a secure a device and originating from a non-secured device, according to some embodiments of the present invention.

DETAILED DESCRIPTION OF THE PREFERRED EMBODIMENTS

Figure 1:
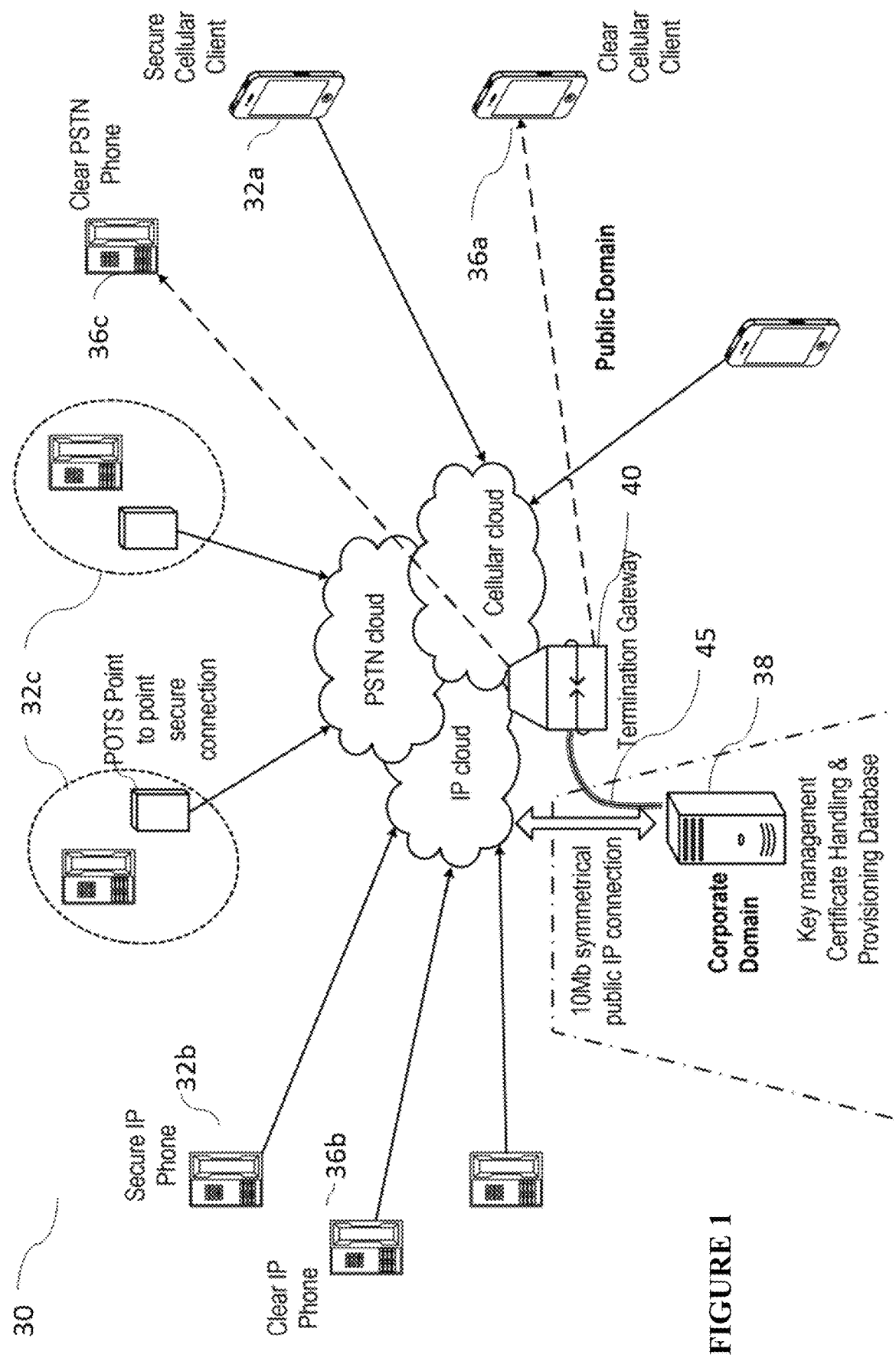

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "transferring", "detecting," "calculating", "processing", "performing," "identifying," "configuring" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

As will be explained in further detail below, the technology described herein relates to protection of mobile device computer systems from malicious activity of unauthorized access via signal interception and/or hacking of the device. More particularly, the present invention discloses signal interception and hacking prevention systems and methods that deploy an application executable to refrain unauthorized access to a user's mobile device to facilitate bilateral integrated prevention and protection of the system.

The term "mobile device/mobile phone" interchangeably refers, but not limited to any communication device configured to operate within mobile phone systems as hybrid (wireless/wire-lined) communication systems. The connection between the mobile phone and the serving unit (base station) uses wireless communication. Base stations are connected to a sophisticated switching center (mobile switching center) through optical fibers or microwave links. The connection between the base station and the mobile switching center might be direct or through a controlling unit called a base station controller. The mobile switching center connects the mobile phones to other mobile phones or to fixed phones through the public phone network. The connections between the base stations, base station controllers, the mobile switching center, and the public switching telephone network usually use optical fiber or microwave links. The connections between the mobile phones and the base stations constitute the radio access node, while the connections between the base station and the mobile switching centers and between the mobile switching centers to each other and to the public switching telephone network constitute the core network (the fixed network). Early mobile phone systems such as the first generation system (advanced mobile phone system (AMPS)) used analog signal representation and processing. AMPS is the mobile phone system standard developed by Bell Labs, and officially introduced, after the approval of the Federal Communications Commission (FCC), in the Americas in 1983 and Australia in 1987. During the 1980s and into the 2000s, it was the technology that was in vogue in North America and other localities. Such analog mobile phone systems could be intercepted easily using radio receivers called frequency scanners. Second generation systems moved to the digital era but with only voice communication and some sort of data communications as in Global system for mobile communication (GSM), code division multiple access (CDMA) (also known as IS-95 or cdmaONE) and digital AMPS (D-AMPS) (also known as TDMA, IS-54 or IS-136). One of the many advantages of the digital mobile phone systems is the ability of encrypting signals for better privacy and security. Advances in mobile technology led to the proliferation of third generation (3G) systems with added features like multimedia communication, mobile commerce, etc. Third generation systems (also known as cdma2000 and UMTS) are based on CDMA technology. AMPS and D-AMPS are now obsolete. Mobile phone operators provide mainly two systems: GSM and CDMA (cdmaONE, cdma2000, or UMTS). Different mobile phone systems vary widely in system design and underlying technology. However, all second and third generation mobile phone systems try to offer high levels of security and privacy to the user through user authentication, signal encryption and user anonymity. Nevertheless, these techniques, unfortunately, do not guarantee the privacy of mobile users.

The term "AES" refers to Advanced Encryption Standard, a specification for the encryption of electronic data established by the U.S. National Institute of Standards and Technology (NIST).

The term "antivirus" interchangeably refers, but not limited to software that is used to prevent, detect, and remove malware, including but not limited to viruses, worms, trojans, spyware, and adware.

The term "APK" interchangeably refers, but not limited to Android Package (e.g., "filename.apk"), a packaging file format for the Android mobile operating system.

The term "botnet" interchangeably refers, but not limited to a collection of software agents, robots, or "zombies" that run autonomously and automatically, typically overtaken by hackers to perform malicious operations.

The term "buffer overflow" interchangeably refers, but not limited to (also known as buffer overrun) an anomaly where a program, while writing data to a buffer, overruns the buffer's boundary and overwrites adjacent memory. Buffer overflows can be triggered by inputs that are designed to execute code or alter the way the program operates. This may result in erratic program behavior, including memory access errors, incorrect results, a crash, or a breach of system security.

The term "Denial of Service (DoS)" interchangeably refers, but not limited to an attack which attempts to make a computer or mobile device resource unavailable to its intended users or for its intended use.

The term "Data Encryption Standard (DES)" interchangeably refers, but not limited to a block cipher that uses shared secret encryption.

The term "Hypertext Transfer Protocol (HTTP)" interchangeably refers, but not limited to a networking protocol for distributed, collaborative, hypermedia information systems. HTTP is the foundation of data communication for the World Wide Web.

The term "encrypted signal" refers to a signal encrypted by a method or system of the invention. Likewise, an "unencrypted signal" is a signal that is not encrypted by a method or system of the invention.

The term "jailbroken" interchangeably refers, but not limited to an Apple iPhone or iPad that has had its Apple iOS operating system covertly "unlocked" to gain full root access, removing all Apple imposed limitations on applications, and essentially exposing all of an application's features.

The term "keylogging" interchangeably refers, but not limited to keystroke logging or the action of tracking (or logging) the keys struck on a keyboard, typically in a covert manner so that the person using the keyboard is unaware that actions are being monitored. There are numerous keylogging methods, ranging from hardware and software-based approaches to electromagnetic and acoustic analysis.

The term "malicious network access" refers to access of a network available either at layers 1 and 2 through interception of an accessible signal (for example, a WiFi signal) or at layers 3 and/or higher through hacking of a client device.

The term "malware" interchangeably refers, but not limited to malicious software, a general term used by computer professionals to mean a variety of forms of hostile, intrusive, or annoying software or program code.

The term "Multimedia Messaging Service (MMS)" interchangeably refers, but not limited to a standard way to send messages that include multimedia content to and from mobile devices. MMS extends the core SMS capability that allows exchange of text messages only up to 160 characters in length.

The term "phishing" interchangeably refers, but not limited to a way of attempting to acquire sensitive information such as usernames, passwords, and credit card details by masquerading as a trustworthy entity in an electronic communication. Communications purporting to be from popular social websites, auction sites, online payment processors, or IT administrators are commonly used to lure unsuspecting users.

The term "rootkit" interchangeably refers, but not limited to malware that lurks camouflaged from anti-malware software and administrators by circumventing or interrupting standard operating system or other application functionality, allowing unseen and unwanted privileged access to a device.

The term "RTP" refers to Real-time Transport Protocol, a network protocol for delivering audio and video over IP networks.

The term "RTCP" refers to RTP Control Protocol (standard RFC-3550), a sister protocol of the Real-time Transport Protocol (RTP). RTCP provides out-of-band statistics and control information for an RTP session.

The term "sandbox" interchangeably refers, but not limited to a security mechanism for separating running programs.

The term "Secure Shell (SSH)" interchangeably refers, but not limited to a network protocol that allows data to be exchanged using a secure channel between two networked devices. The two major versions of the protocol are referred to as SSH1 (or SSH-1), and SSH2 (or SSH-2).

Used primarily on Linux and Unix-based systems to access shell accounts, SSH was designed as a replacement for Telnet and other insecure remote shells, which send information, notably passwords, in plain text, rendering them susceptible to packet analysis.

The term "spyware" interchangeably refers, but not limited to a type of malware that collects information and makes it available, usually secretly, to a third party. The presence of spyware is typically hidden from the user and can be difficult to detect.

The term "SASL" refers to Simple Authentication and Security Layer (standard RFC 4422), a framework for authentication and data security in Internet protocols. It decouples authentication mechanisms from application protocols, in theory allowing any authentication mechanism supported by SASL to be used in any application protocol that uses SASL.

The term "SHA-1" refers to Secure Hash Algorithm 1 (standard RFC-3174), a cryptographic hash function designed by the United States National Security Agency and is a U.S. Federal Information Processing Standard published by the United States NIST. SHA-1 produces a 160-bit hash value known as a message digest. A SHA-1 hash value is typically rendered as a hexadecimal number, 40 digits long.

The term "SSL" refers to Secure Sockets Layer, the standard technology for establishing an encrypted link between a web server and a browser. This link ensures that all data passed between the web server and browsers remain private and integral. SSL is an industry standard and is used by millions of websites in the protection of their online transactions with their customers.

The term "SRTP" refers to Secure Real-time Transport Protocol, which defines a profile of RTP (Real-time Transport Protocol), intended to provide encryption, message authentication and integrity, and replay protection to the RTP data.

The term "TLS/SSL" refers to Transport Layer Security (TLS) and its predecessor, Secure Sockets Layer (SSL), both of which are frequently referred to as "SSL." They are cryptographic protocols that provide communications security over a computer network.

The term "trojan" interchangeably refers, but not limited to software that appears to perform a desirable function while containing malicious and/or undesirable elements.

The term "virus definition/signature" interchangeably refers, but not limited to a unique string of bits, or the binary pattern of the machine code of a virus. The term "virus definitions" also typically refers to the database of all current virus signature files used by a particular antivirus software for virus detection. Virus definitions are the primary method of detection for most antivirus software programs.

The term "Wireless Application Protocol (WAP)" interchangeably refers, but not limited to an open international standard; commonly used Web browser for small mobile devices such as cell phones or smartphones.

The term "XEP-0078" refers to a protocol for authentication with a Jabber/Xabber server, using the SHA1 algorithm.

The term "zombie" interchangeably refers, but not limited to an Internet connected mobile device that has been compromised by a virus or trojan that can be used to perform malicious tasks under remote direction, usually from a botnet.

The term "end-point (mobile) device" interchangeably refers, but not limited to computers ("machines" and "computers" are used interchangeably herein) and computing or computer systems (for example, physically separate locations or devices), computer and computerized devices, processors, processing systems, computing cores (for example, shared devices), and similar systems, modules and combinations of the aforementioned, servers in a form of a remote computer or remote computer system, or computer program therein, that is accessible over a communications medium, such as a communications network including the Internet, that provides services to other computer programs (and their users), in the same or other computers. A server may also include a virtual machine, a software based emulation of a computer, and/or hardware based emulation (such as VMWare ESXi servers).

The term "normal working curve" refers to normal behavior of a device as measured by correlation between system calls and network calls, signatures of applications running on the device, certificates of application servers, and other threat checks made by a network server serving the device, such as known viruses, known attacks, and APK signatures.

While the invention is susceptible to various modifications and alternative forms, specific embodiments thereof have been shown by way of example in the drawings and the above detailed description. It should be understood, however, that it is not intended to limit the invention to the particular forms disclosed, but on the contrary, the intention is to cover all modifications, equivalents, and alternatives falling within the spirit and scope of the invention as defined by the appended claims.

Preferred Embodiments

Reference is now made to FIG. 1, illustrating an operating environment and elements of a system 30 for preventing a third-party interception of voice or text signals transmitted from and received by a secure device 32a-c and addressed to one or more non-secured devices 36a-c, according to some embodiments of the present invention. Secured and non-secured devices are connected to a phone system "cloud" and can be any of a cellular phone 32a, 36a, connected to a cellular cloud 44; an IP telephone 32b, 36b connected to an IP cloud 46; or a PSTN phone 32c, 36c connected to the phone system through a PSTN cloud 48.

In system 30, a secured IP phone 32b transmits voice and text signals (e.g., data packets) addressed to one or more non-secured devices 36a-c: the application encrypts the signals and the encrypted signal is transmitted over an encrypted access line 34, which can be wired or wireless. An encryption switch 38 receives and decrypts the encrypted signal. Encryption switch 38 transmits a clear IP tunneling signal over an IP tunnel 45. A termination gateway 40 receives the IP tunneling signal and converts it to a PSTN-compatible signal (e.g., E1, T1). Provision is made (not shown in FIG. 6) for encrypting PSTN signals destined for a secure PSTN phone. The termination gateway 40 transmits encrypted and decrypted PSTN signals to secure 32c and clear 36c PSTN phones, respectively, and secure and clear cellular phones.

System 30, also works in reverse, whereby termination gateway 40 receives encrypted and clear signals from PSTN 48 and converts them to IP tunneling signals, which encryption switch 38 encrypts and transmits to a secured IP phone 32b. Secured IP phone 32b decrypts the signals into voice and text.

The term PSTN shall hereinafter include the cellular cloud as well.

Figure 2:
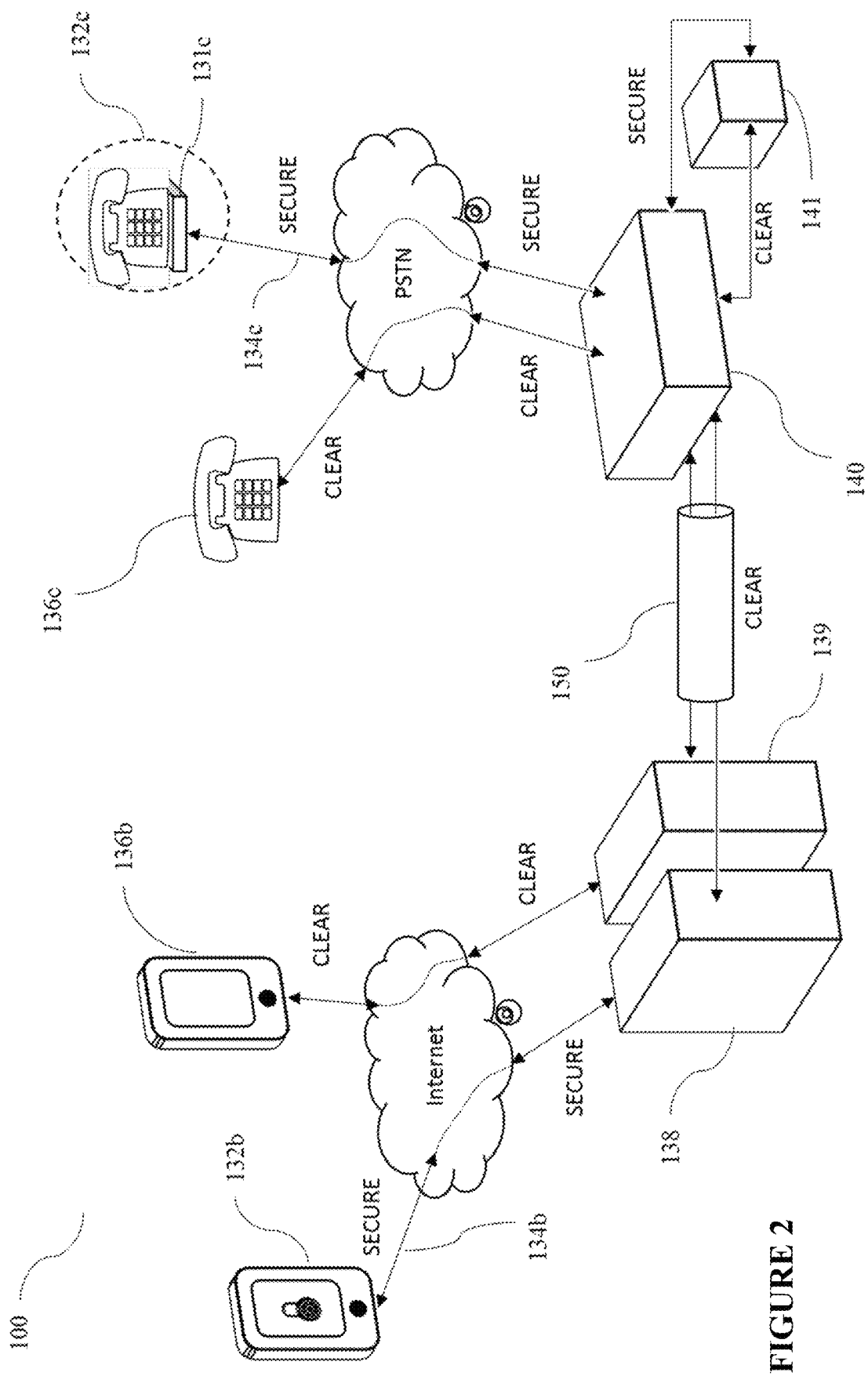
FIG. 2 illustrates a non-interception system enabling voice and text communication of anti-interception protected packet-switched phones with protected circuit-switched phones and clear circuit-switched phones; and of protected circuit-switched phones with protected packet-switched phones and clear packet-switched phones, according to some embodiments of the present invention.

Reference is now made to FIG. 2, illustrating an anti-interception system 100 enabling voice and text communication of protected packet-switched phones 132b with protected circuit-switched phones 132c and clear circuit-switched phones 136c; and of protected circuit-switched phones 132c with protected packet-switched phones 132b and clear packet-switched phones 136b. System 100 comprises a. a computer-readable medium (CRM) of each protected packet-switched phone 132b, installed thereon an anti-interception application configured for a processor of the protected packet-switched phone 132b to
 1) encrypt a PSTN-bound voice or text packet-switched signal and transmit the encrypted PSTN-bound packet-switched signal over a packet-switched encrypted access line 134b; and
 2) receive, over the packet-switched encrypted access line (134b), and decrypt an encrypted internet-bound voice or text packet-switched signal;

b. an encryption switch 138 in communicative connection over the Internet with protected packet-switched phones 132b, encryption switch 138 configured to
 1) receive and decrypt the encrypted PSTN-bound packet-switched signal, producing a PSTN-bound IP tunneling signal;
 2) transmit the PSTN-bound IP tunneling signal over an IP tunnel 145; and
 3) receive, over IP tunnel 145, and encrypt an internet-bound IP tunneling signal that is destined for a protected packet-switched phone (132b), thereby producing the encrypted internet-bound packet-switched signal;
 4) transmit the encrypted internet-bound packet-switched signal to the protected packet-switched phone (132b);

c. a clear switch 139 in communicative connection over the Internet with a clear packet-switched phone 136b, the clear switch 139 configured to
 1) receive a clear PSTN-bound packet-switched signal from a clear packet-switched phone 136b, producing a PSTN-bound IP tunneling signal transmitted over IP tunnel 145; and
 2) receive, over IP tunnel 145, an internet-bound IP tunneling signal that is destined for a clear packet-switched phone 136b, producing an internet-bound clear packet-switched signal transmitted over the Internet to the clear packet-switched phone 136;

d. a termination gateway 140, in communicative connection with encryption switch 138, clear switch 139, and PSTN; the termination gateway 140 configured to
 1) receive the PSTN-bound IP tunneling signals from encryption switch 138 and clear switch 139;
 2) convert PSTN-bound IP tunneling signals to PSTN-bound clear circuit-switched signals;
 3) transmit the PSTN-bound clear circuit-switched signals that are destined for a receiving clear circuit-switched phone 136c to the receiving clear circuit-switched phone, over the PSTN;
 4) receive an encrypted internet-bound circuit-switched signal from a transmitting protected circuit-switched phone 132c over the PSTN;
 5) receive a clear internet-bound circuit-switched signal from a transmitting clear circuit-switched phone 136c over the PSTN;

e. a secure gateway modem 141 in communicative connection with termination gateway 140 configured to
 1) receive and encrypt clear circuit-switched signals from termination gateway 138; and
 2) receive and decrypt encrypted circuit switched signals from termination gateway 138;
wherein the termination gateway 138 is further configured to
 5) transmit the clear PSTN-bound circuit-switched signals that are destined for a receiving protected circuit-switched phone 132c to secure gateway modem 141 and receive encrypted PSTN-bound circuit-switched signals;
 6) transmit the encrypted PSTN-bound circuit-switched signals destined for the receiving protected circuit-switched phone 132c to the receiving protected circuit-switched phone 136c, over the PSTN;
 7) transmit the internet-bound encrypted circuit-switched signal to secure gateway modem 141 and receive a clear internet-bound circuit-switched signal;
 8) convert the clear internet-bound circuit-switched signals to the internet-bound IP tunneling signals and transmit the internet-bound IP tunneling signals over the IP tunnel 145; and f. a secure modem 131c for each of the protected circuit-switched phones 132c, the secure modem 131c configured to
 1) receive, over an encrypted circuit-switched access line 134c, and decrypt the encrypted PSTN-bound circuit switched signals;
 2) receive, from a PSTN phone, and encrypt a clear signal PSTN signal, thereby producing the encrypted internet-bound circuit switched signal, and transmit the encrypted internet-bound circuit switched signal over encrypted circuit-switched access line 134c.

Figure 3:
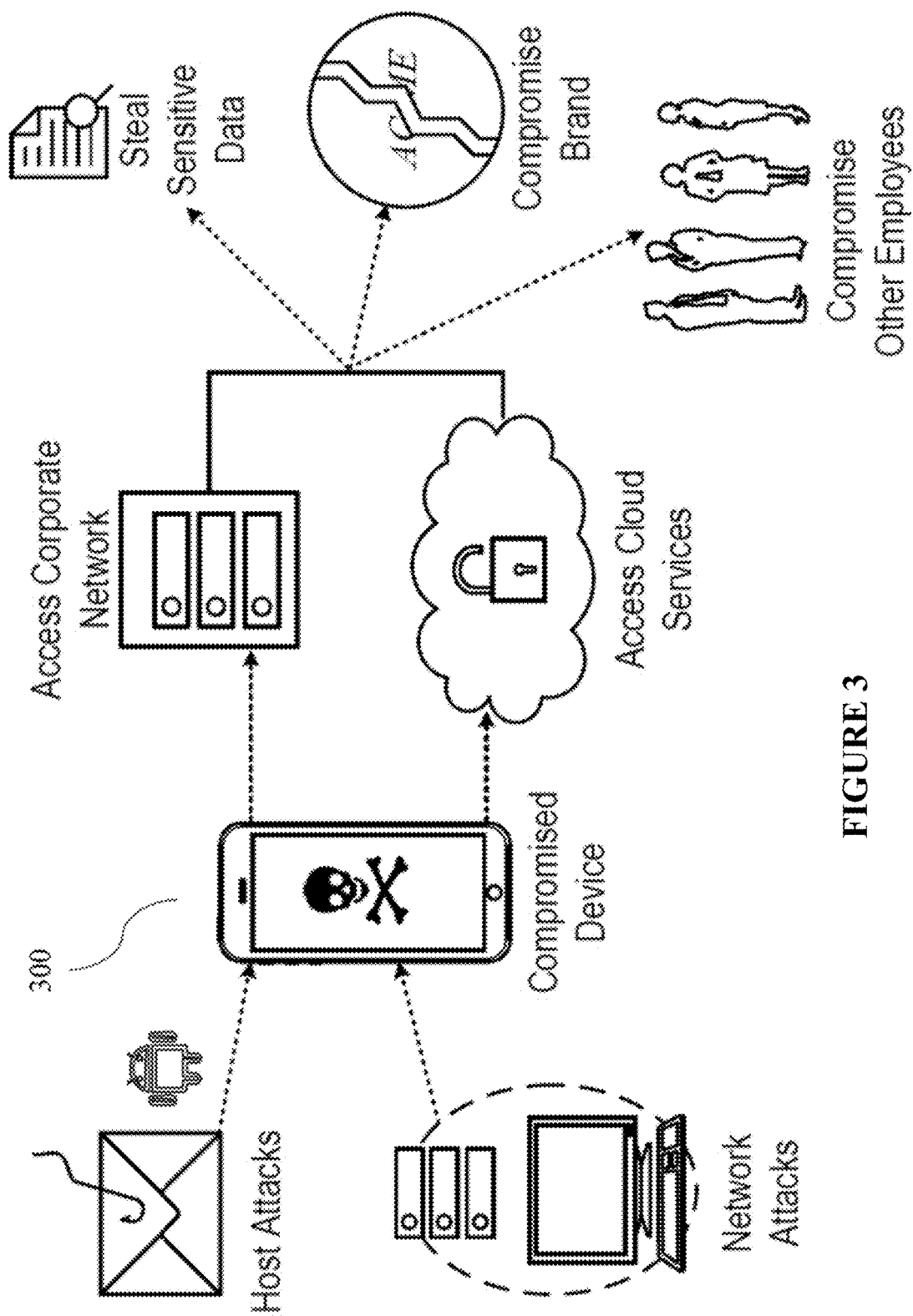
FIG. 3 illustrates an example of a compromised device, suited for implementing thereon a hacking-prevention application.

Another aspect of the present invention provides a communication device such as a smartphone with anti-hacking protection. FIG. 3 shows the dangers potentially encountered by an unprotected smartphone 300 connected to a corporate network and cloud services. The compromised device 300 is subject to host attacks (attacks that exploit the vulnerabilities of an OS or a specific application) and network attacks (e.g., man-in-the-middle, SSL stripping, and ARP poisoning attacks). Additionally, the compromised device 300 may be used to hack into the connected corporate network and cloud services and steal sensitive data, compromise brand reputation, and compromise private data of other employees.

Figure 4:
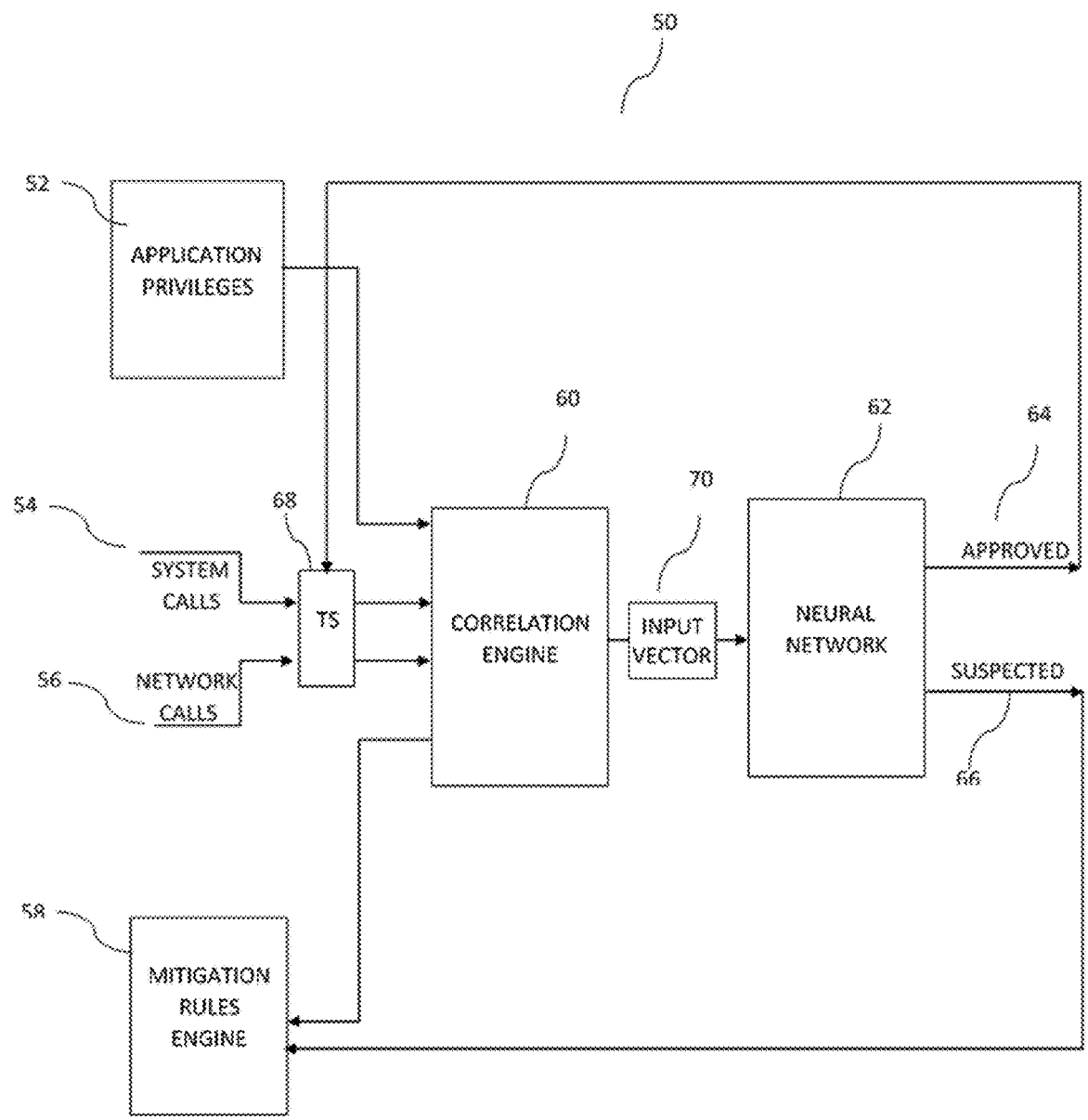
FIG. 4 illustrates a hacking-prevention system, provided by a hacking-prevention application loaded on a hacking-protected device, according to some embodiments of the present invention.

Reference is now made to FIG. 4, illustrating hacking prevention system 50 provided by a hacking prevention application loaded on a secure device. Hacking prevention system 50 comprises a. a correlation module 60 configured to receive 1) timestamped system calls 54—calls for routines of an OS of the device; and 2) network calls 56—requests for access or status from a network;

b. a time stamp module 68, configured to receive the system calls 54 and network calls 56 and associate timestamps with each of the system calls 54 and network calls 56;
 wherein the correlation module is configured to package the timestamped system calls 54, and the timestamped network calls 56 into an input vector 70;

c. an applications privileges database 52, the database 52 comprising one or more lists of privileges for one or more applications installed on the device;

wherein the correlation module 60 is configured to receive the one or more lists of privileges;
d. a neural network 62, configured to receive the input vector 70;
e. an approved output 64 and a suspected output 66 of the neural network 62; and
f. a mitigation rules engine 58;
g. wherein:
  i) the correlation module is further configured to compute parameters of the system calls 54 and the network calls 56, the parameters selected from a group consisting of: a difference in time values of the timestamp of a system call and a network call, a correspondence of a system call or of a network call with a privilege in one or more of the privileges lists pertaining to an application making the system call or network call, a validity of a certificate attached to the network call, or any combination thereof and further package the parameters into the input vector 70;
  ii) the neural network is configured to receive the input vector 70 and determine whether a the system call 54 or a the network call 56 is approved or suspected as a hacking attempt of the device;
  iii) an approved system call or network call is fed to the approved output 64;
  iv) a suspected system or network call is fed to the suspected output 66; and
  v) the mitigation rules engine 58 is configured to receive the suspected output 66 and determine an action as a function of the suspected output 66.

Figure 5:
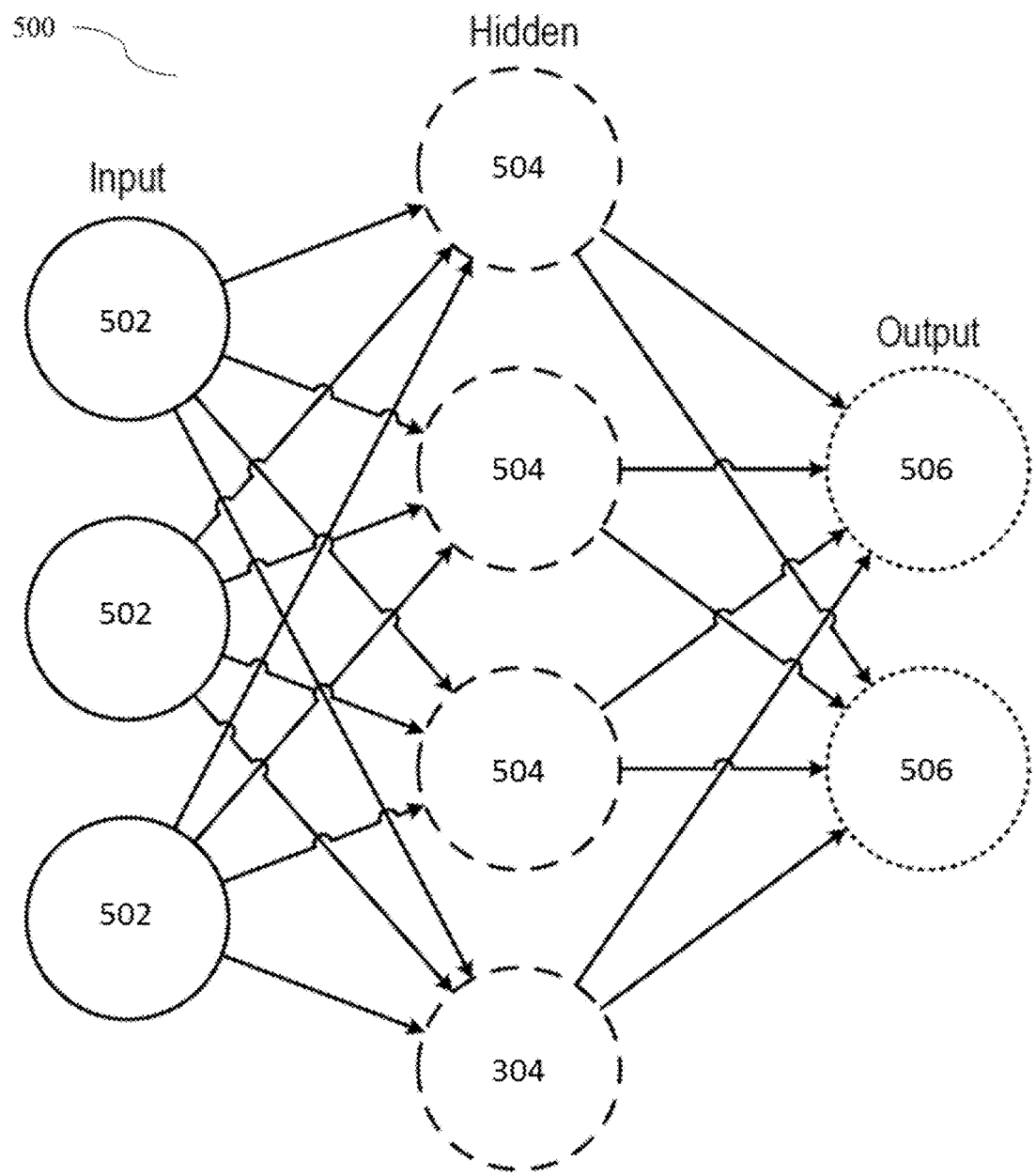
FIG. 5 illustrates an a neural network used of a hacking-prevention system, according to some embodiments of the invention.

Reference is now made to FIG. 5, which is a schematic illustration of an example of the neural network 500 of hacking prevention system 50. Inputs refer to system call and network calls, the output creates the "normal working curve" of the device; The application is configured to receive access privileges upon initial scanning of the at least one communication device wherein the network is configured to operate under conditions wherein the inputs are the system calls data, the networks calls data 502, whether the privileges of all applications are installed data, and time stamp data, transferred via hidden intermediate states 504 (internal "stepping-stone" states between inputs and outputs) and wherein the outputs are "good" or "not good" 506, deterministic and/or with a reference value to state the level of correlation, whether definite and/or in scale.

Anti-interception system 30, 100 and hacking prevention system 50 may be combined on a single secured device, by installing both the anti-interception application and hacking prevention application on the same device, providing a complete system to protect the secured device from interception of both incoming and outgoing voice and text as well as from hacking.

Figure 6:
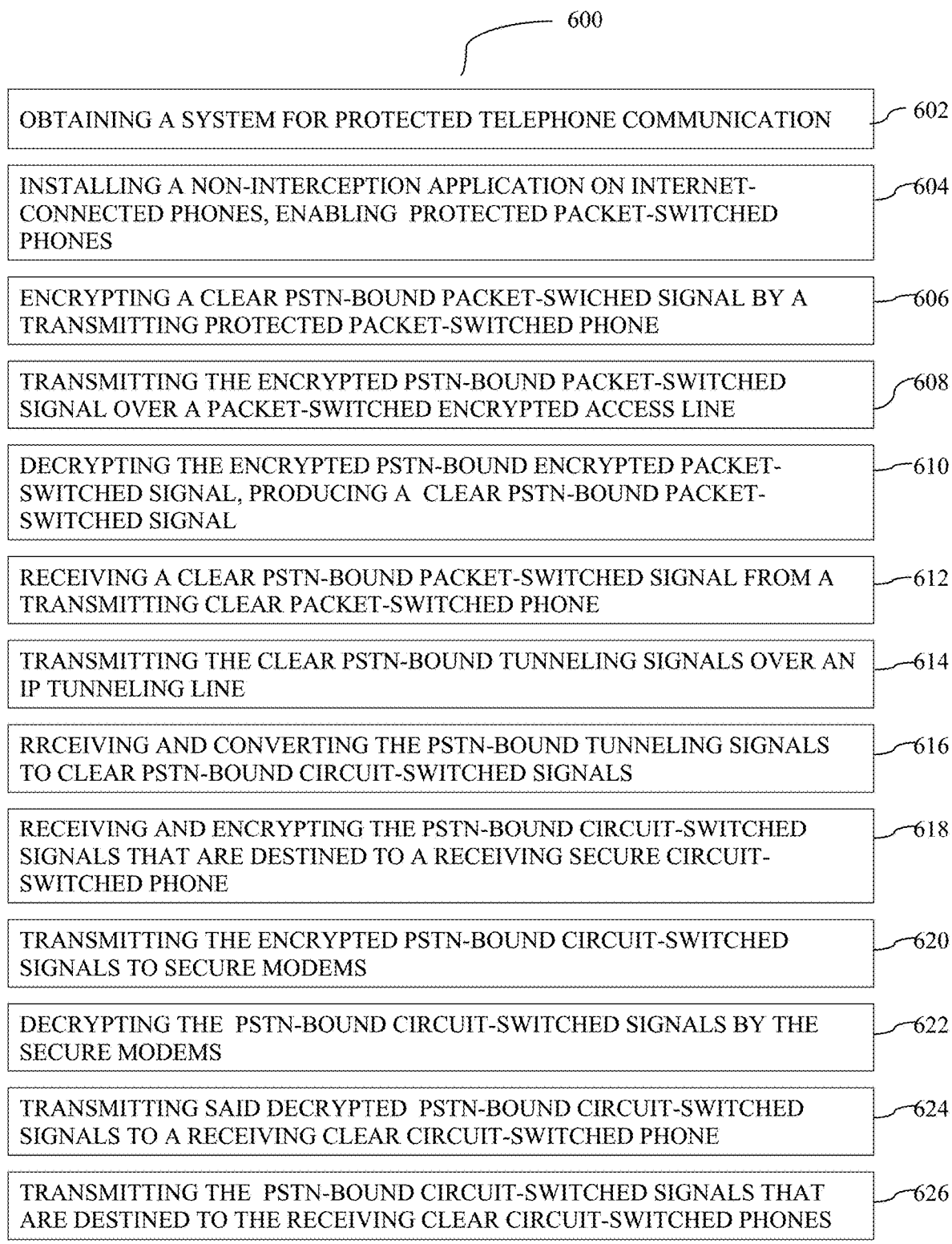
FIG. 6 illustrates a non-interception method enabling voice and text communication of anti-interception protected packet-switched phones with protected circuit-switched phones and clear circuit-switched phones; and of protected circuit-switched phones with protected packet-switched phones and clear packet-switched phones, according to some embodiments of the present invention.
Figure 6:
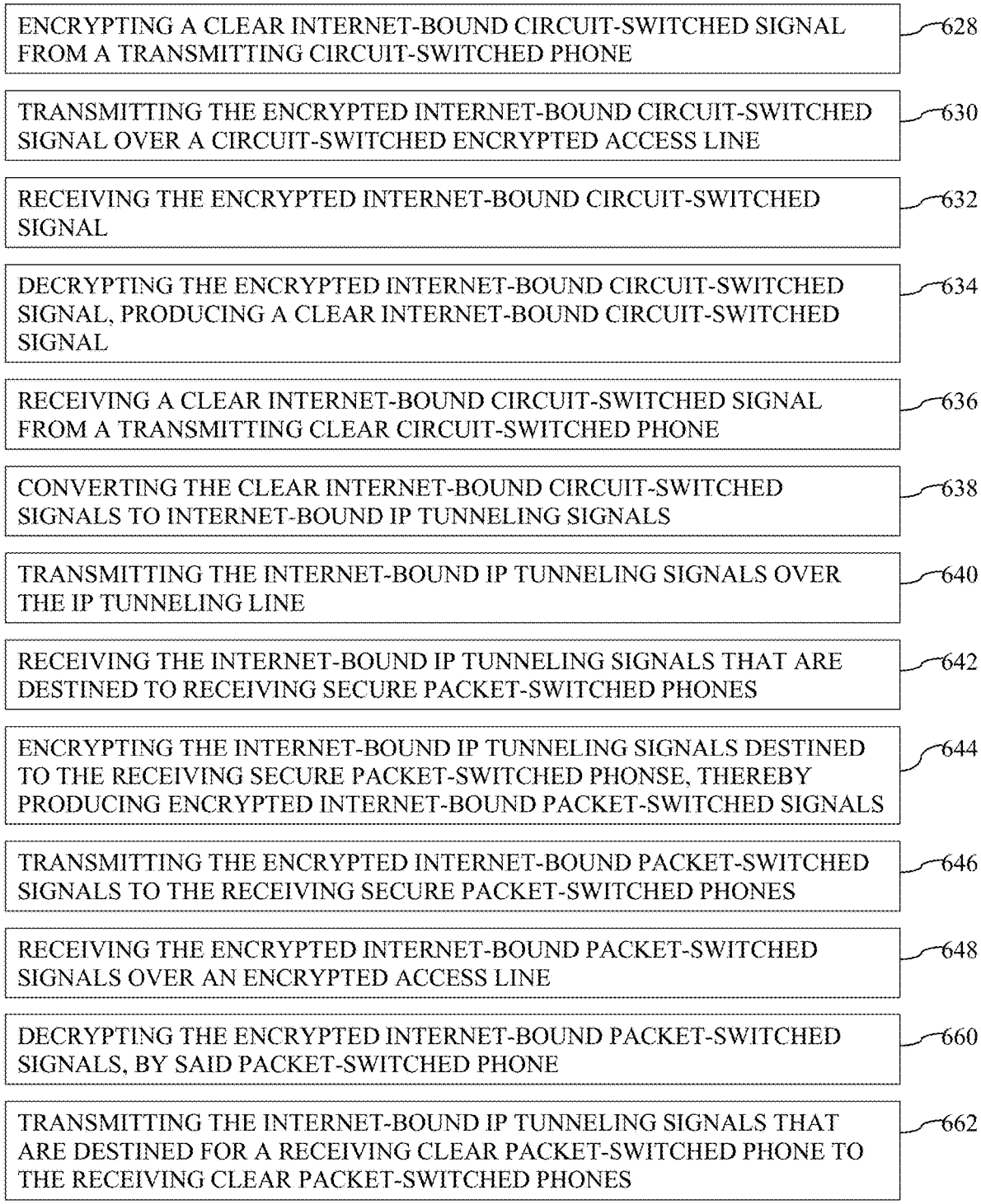

Reference is now made to FIG. 6, illustrating a method 600 for voice and text communication of one or more protected packet-switched phones with protected circuit-switched phones and with clear circuit-switched phones; and of one or more protected circuit-switched phones with protected packet-switched phones and with clear packet-switched phones; the method comprising steps of
  a. obtaining a system for voice and text communication of one or more protected packet-switched phones with protected circuit-switched phones and with clear circuit-switched phones; and of one or more protected circuit-switched phones with protected packet-switched phones and with clear packet-switched phones 602;
  b. installing a non-interception application on one or more internet-connected phones, thereby enabling the internet-connected phones as protected packet-switched phones 604;
  wherein communication from packet-switched to circuit-switched phones comprises steps of
  c. encrypting a PSTN-bound voice or text packet-switched signal by a transmitting protected packet-switched phone 606;
  d. transmitting the encrypted PSTN-bound packet-switched signal, by the transmitting protected packet-switched phone, over a packet-switched encrypted access line in connection with the Internet 608;
  e. receiving and decrypting the encrypted PSTN-bound encrypted packet-switched signal, by an encryption switch in connection with the Internet, thereby producing a clear PSTN-bound packet-switched signal 610;
  f. receiving a clear PSTN-bound packet-switched signal, by a clear switch, transmitted from a transmitting clear packet-switched phone over the Internet 612;
  g. transmitting the PSTN-bound clear packet-switched signals, by the encryption switch and the clear switch, as PSTN-bound IP tunneling signals over an IP tunnel 614;
  h. receiving, by a termination gateway connected to the IP tunnel, the PSTN-bound IP tunneling signals and converting the PSTN-bound IP tunneling signals to one or more clear PSTN-bound circuit-switched signals 616;
  i. receiving and encrypting the clear PSTN-bound circuit-switched signals that are destined to a receiving secure circuit-switched phone, by a secure gateway module in communicative connection with the termination gateway 618;
  j. transmitting the encrypted PSTN-bound circuit-switched signals, by the termination gateway, to receiving secure modems connected to the PSTN over circuit-switched encrypted access lines 620;
  k. decrypting, by the secure modems, the encrypted PSTN-bound circuit-switched signals 622;
  l. transmitting, by the secure modem, the decrypted PSTN-bound circuit-switched signal to one or more receiving PSTN phones 624; and
  m. transmitting the clear PSTN-bound circuit-switched signals that are destined for a receiving clear circuit switched phone to the receiving clear circuit-switched phones, by the termination gateway over the PSTN 626; and
  wherein communication from circuit-switched to packet-switched phones comprises steps of
  n. encrypting a clear internet-bound circuit-switched signal from a transmitting circuit-switched phone, by a secure modem 628;
  o. transmitting the encrypted internet-bound circuit-switched signal, by the secure modem, over a circuit-switched encrypted access line 630;
  p. receiving the encrypted internet-bound circuit-switched signal, by the termination gateway 632;
  q. decrypting the encrypted internet-bound circuit-switched signal, by the secure gateway module, thereby producing a clear internet-bound circuit-switched signal 634;
  r. receiving, by the termination gateway, a clear internet-bound circuit-switched signal from a transmitting clear circuit-switched phone 636;
  s. converting the clear internet-bound circuit-switched signals to internet-bound IP tunneling signals 638;

t. transmitting the internet-bound IP tunneling signals, by the termination gateway, over the IP tunnel 640;

u. receiving, by the encryption switch, the internet-bound IP tunneling signals that are destined to a receiving the secure packet-switched phone 642;

v. encrypting, by the encryption switch, the internet-bound IP tunneling signals destined to the receiving secure packet-switched phone, thereby producing encrypted internet-bound packet-switched signals 644;

w. transmitting the encrypted internet-bound packet-switched signals to the receiving secure packet-switched phones 646;

x. receiving, by a receiving secure packet-switched phones over a the encrypted access line, the internet-bound packet-switched signals 648;

y. decrypting the encrypted internet-bound packet-switched signals, by the receiving packet-switched phones 650; and z. transmitting the internet-bound IP tunneling signals that are destined for a clear receiving packet-switched phone, by the clear server, to the receiving clear packet-switched phones 652.

Figure 7:
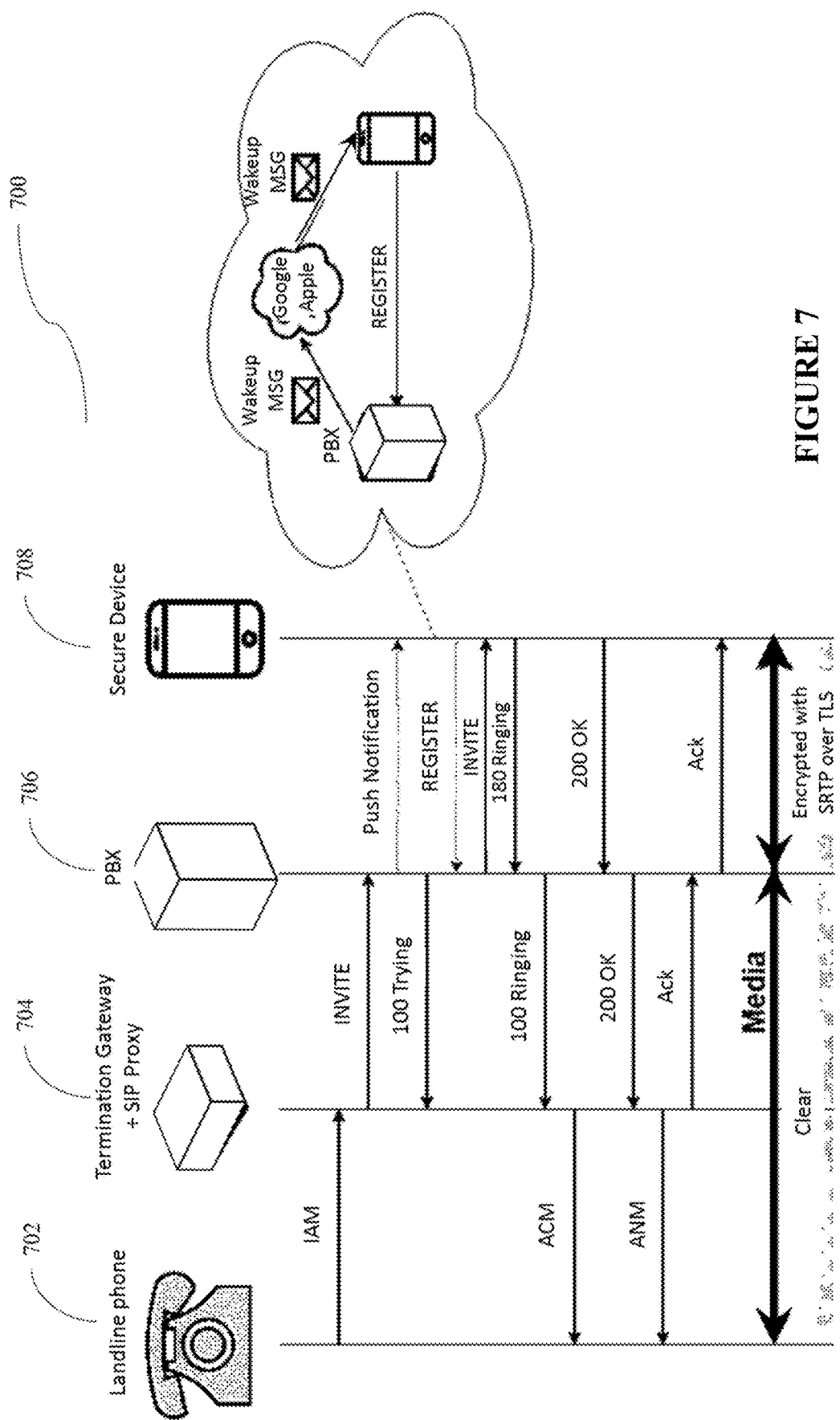
FIG. 7 illustrates a message sequence diagram of a phone call made from a POTS phone to an IP phone, according to some embodiments of the present invention.

Reference is now made to FIG. 7, showing a message sequence diagram 700 of a phone call made from a POTS phone 702 to an IP phone 708. While IP phone depicted in this embodiment is secured with an installed anti-interception application (further described herein), IP phone 708 may also be a clear IP phone.

A POTS landline telephone 702 initiates an IAM (initial address message) command to a termination gateway 704 over the PSTN using circuit switched signaling. Termination gateway 704 sends INVITE command using SIP signaling to the PBX 706, and then PBX 706 sends a "push notification" to the Secure Device 708 (BYOD Smartphone with an App installed) and waits for the Secure Device 708 to register. Meanwhile PBX 706 sends "Trying" command to Termination gateway 704; throughout this process, the call is in "HOLD" state until the Secure Device 708 is Successfully registered, then the PBX 706 resumes (UNHOLDS) the call.

The present invention thereby enables a secure phone 708 on an encrypted access line to receive a push notification of an incoming phone call. This enables the anti-interception application to operate in the background of the secure phone 708, consuming relatively low power, and then be application is woken up by the push notification. Encryption-secured IP phone 708 may thereby be awakened in response to a call, even from a POTS phone 702, and alert the user of secure phone 708 with a ringtone. In some embodiments, the anti-interception application may be downloaded from a consumer app store, such as Google Play or Apple AppStore. Virtually any smartphone (authorized to connect with an encryption switch further described herein) may thereby conveniently be converted to a secure IP phone 708 with universal access to phones—clear and encrypted—on the PSTN and the IP cloud with complete incoming call alert functionality.

Figure 8:
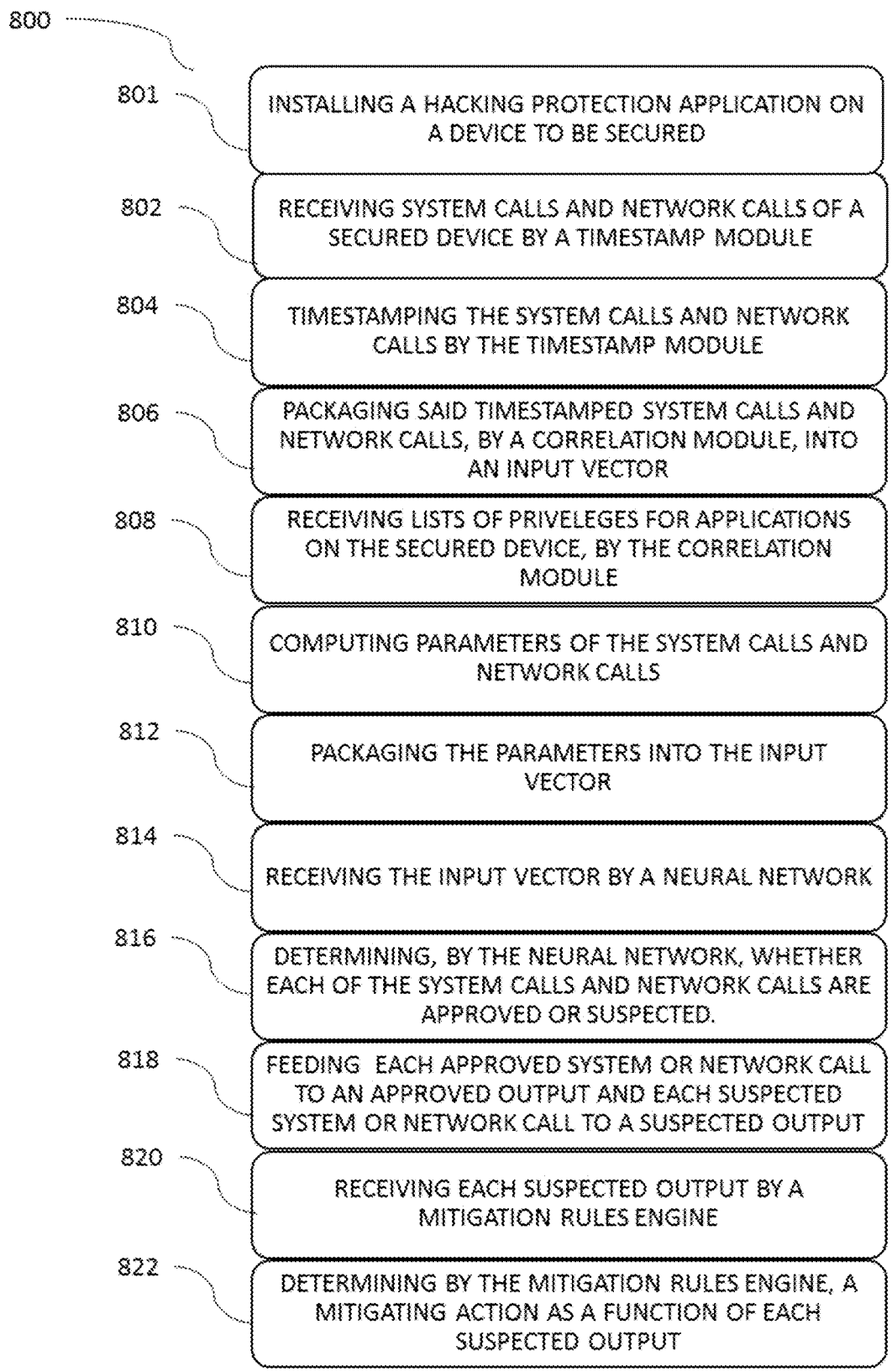
FIG. 8 illustrates a hacking-prevention method, provided by a hacking-prevention application loaded on a hacking-protected device, according to some embodiments of the present invention.

Reference is now made to FIG. 8, illustrating a method 800 for protecting a secured device connected to one or more networks from access via hacking.

A method 800 for protecting a secured device from access via hacking, the method comprising the step of installing on the secured device an application executable on a non-transitory computer-readable medium of the secured device 801; said secured device with said application effecting further steps of the method comprising the steps of:

a. receiving one or more system calls and one or more network calls of said secured device, by a timestamp module 802;

b. timestamping said system calls and said network calls by said timestamp module 804;

c. packaging said timestamped system calls and timestamped network calls, by a correlation module, into an input vector 806;

d. receiving, by said correlation module, one or more lists of privileges for one or more applications installed on said secured device 808;

wherein the method 800 further comprises the steps:

e. computing parameters of said system calls and said network calls 810, said parameters selected from a group comprising a difference in time values of said timestamp of a said system call and a said network call, a correspondence of a said system call or of a said network call with a privilege in one or more of said lists pertaining to an application making said system call or said network call, a validity of a certificate attached to said network call, or any combination thereof;

f. further packaging said parameters into said input vector 812;

g. receiving said input vector by a neural network 814;

h. determination, by said neural network, of whether a said system call or a said network call is approved or suspected 816;

i. feeding a said approved system or network call to an approved output and a suspected system or network call to a suspected output 818;

j. receiving, by a mitigation rules engine, said suspected output 820; and k. determining, by said mitigation rules engine, a mitigating action as a function of said suspected output 822.

Figure 9:
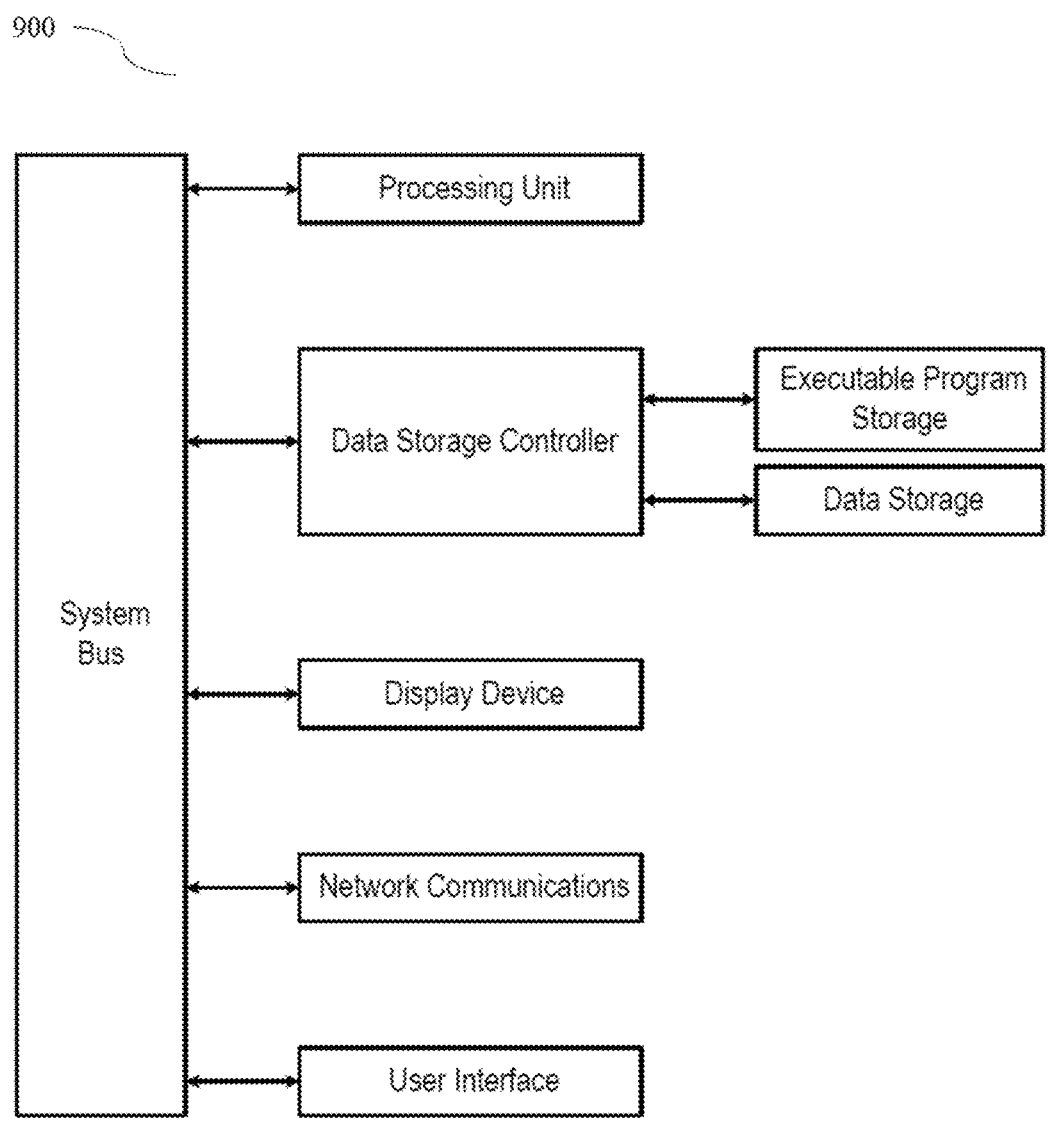
FIG. 9 illustrates an example of a computerized environment for implementing the invention according to a preferred embodiment.

Reference is made now to FIG. 9 which illustrates, according to an embodiment of the present invention, an example of a computerized system for implementing the invention 600. The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), touch-screen; or touch-pad, virtual display, or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as C, C++, Assembly, C#™, JAVA™, Flash™ ActionScript, Visual Basic™, JavaScript™, PHP, Python, XML, HTML, etc. or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as TCP/UDP/ICMP/HTTP/DNS/SOAP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Google™ Android™, Unix™/X-Windows™, Windows Mobile™, Windows Phone™, Linux™, etc.

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of environment tracking systems, data representing user events, virtual elements, etc. can be stored in tables in the RDBMS. The tables can have pre-defined relationships between them. The tables can also have adjuncts associated with the coordinates.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., Bluetooth, Wi-Fi, GSM, CDMA, 2g, 3g, UMTS, LTE, WiMAX, ZigBee and alike, a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A telephone system enabling voice and/or text communication between secure POTS phones and clear IP phones, comprising a termination gateway, in connection with the PSTN, configured to
   a. receive first clear IP tunneling data, from a clear switch in communicative connection with one or more clear IP phones;
   b. transmit second clear IP tunneling data to said clear switch;
   c. convert said first IP tunneling data to first clear circuit-switched signals;
   d. convert second clear circuit-switched signals to said second clear IP tunneling data;
   e. transmit first encrypted circuit-switched signals to secure modems of said secure POTS phones over said PSTN; and
   f. receive second encrypted circuit-switched signals over said PSTN, originating from said secure modems; and
the system further comprises a secure gateway modem, in communicative connection with said termination gateway, configured to
   g. encrypt said first clear circuit-switched signals into said first encrypted circuit-switched signals; and
   h. decrypt said second encrypted circuit-switched signals into said second clear circuit-switched signals;
said telephone system enables voice and/or text communication between secure IP phones and clear POTS phones or said secure POTS phones, said system further comprising
   a. one or more secure IP phones configured to transmit and receive encrypted IP voice data;
   b. an encryption switch, in communicative connection with said secure IP phones and termination gateway, configured to i. receive said transmitted encrypted IP voice data from each said secure IP phones;
   ii. transmit, to each of said secure IP phones, said received encrypted IP voice data;
   iii. decrypt said transmitted encrypted IP voice data from each of said secure IP phones;
   iv. convert said decrypted IP voice data to a third clear IP tunneling signal to said termination gateway;
   v. receive a fourth clear IP tunneling signal from said termination gateway; and
   vi. convert and encrypt said fourth clear IP tunneling signal to said received encrypted IP voice data; and
   c. the termination gateway is further in communicative connection with one or more clear POTS phones and further configured to
      i. convert said third clear IP tunneling signal to clear circuit-switched signals received by said POTS phones; and
      ii. convert clear circuit-switched signals received from said POTS phones to said fourth clear IP tunneling signal;
said system is configured for communication between any combination of said secure POTS phones, said secure IP phones, smartphones installed thereon a non-interception application configured to effect transmission and reception of encrypted IP data, said clear POTS phones, said clear IP phones, and clear cellular phones.

2. The telephone system of claim 1, wherein said termination gateway and said clear and encryption switches employ the Session Initiation Protocol (SIP) for one or more of said first through fourth clear IP tunneling signals.

3. The telephone system of claim 1, wherein said encryption switch and said application are further configured for said secure IP phones to receive push notifications of incoming phone calls from said secure POTS phones and said clear POTS phones.

4. The telephone system of claim 3, wherein said application is downloaded and installed on said protected packet-switched phone through an online consumer application store.

5. The telephone system of claim 1, further configured to facilitate a conference call subsequently fully or partly encrypting the transmission and reception of two or more said phones.

6. The telephone system of claim 1, wherein said encryption switch is further configured for handling a key management certificate and storing a provisioning data base.

7. The telephone system of claim 6, wherein said encryption switch is further configured to supervise certificates for download by clients comprising said secure IP phones, said PSTN phones/modems, and secure cellular phones.

8. A telephonic method enabling voice and/or text communication between secure POTS phones and clear IP phones, in which a termination gateway in connection with the PSTN performs steps of
   a. receiving first clear IP tunneling data, from a clear switch in communicative connection with one or more clear IP phones;
   b. transmitting second clear IP tunneling data to said clear switch;
   c. converting said first IP tunneling data to first clear circuit-switched signals;
   d. converting second clear circuit-switched signals to said second clear IP tunneling data;
   e. transmitting first encrypted circuit-switched signals to secure modems of said secure POTS phones over said PSTN; and
   f. receiving second encrypted circuit-switched signals over said PSTN, originating from said secure modems; and
the method further comprises a secure gateway modem, in communicative connection with said termination gateway, performing steps of
   a. encrypting said first clear circuit-switched signals into said first encrypted circuit-switched signals; and
   b. decrypting said second encrypted circuit-switched signals into said second clear circuit-switched signals;
said telephonic method further enables voice and/or text communication between secure IP phones and clear POTS phones, said method further comprising steps of
   a. one or more secure IP phones transmitting and receiving encrypted IP voice data;
   b. an encryption switch, in communicative connection with said secure IP phones and termination gateway, performing steps of
      i. receiving said transmitted encrypted IP voice data from each of said secure IP phones;
      ii. transmitting, to each of said secure IP phones, said received encrypted IP voice data;
      iii. decrypting said transmitted encrypted IP voice data from each of said secure IP phones;
      iv. converting said decrypted IP voice data to a third clear IP tunneling signal to said termination gateway;
      v. receiving a fourth clear IP tunneling signal from said termination gateway; and
      vi. converting and encrypting said fourth clear IP tunneling signal to said received encrypted IP voice data; and
   c. the termination gateway in communicative connection with one or more clear POTS phones performing steps of
      i. converting said third clear IP tunneling signal to clear circuit-switched signals received by said POTS phones; and
      ii. converting clear circuit-switched signals received from said POTS phones to said fourth clear IP tunneling signal;
said telephonic method, further comprises a step of enabling communication between any combination of said secure POTS phones, said secure IP phones, smartphones installed thereon a non-interception application configured to effect transmission and reception of encrypted IP data, said clear POTS phones, said clear IP phones, and clear cellular phones.

9. The telephonic method of claim 8, further comprising a step of said termination gateway and said clear and encryption switches employing the Session Initiation Protocol (SIP) for one or more of first through fourth clear IP tunneling signals.

10. The telephonic method of claim 8, further comprising a step of said encryption switch and said application enabling said secure IP phones to receive push notifications of incoming phone calls from said secure POTS phones and said clear POTS phones.

11. The telephonic method of claim 10, wherein further comprising steps of downloading and installing said application on said protected packet-switched phone through an online consumer application store.

12. The telephonic method of claim 8, further comprising a step of facilitating a conference call subsequently fully or partly encrypting the transmission and reception of two or more said phones.

13. The telephonic method of claim 8, further comprising steps of the encryption switch handling a key management certificate and storing a provisioning data base.

14. The telephonic method of claim 13, further comprising a step of said encryption switch supervising certificates for download by clients comprising said secure IP phones, said PSTN phones/modems, and secure cellular phones.

* * * * *